(No Model.)
W. A. EMMERSON.
VEHICLE HUB.
No. 601,615.  Patented Mar. 29, 1898.
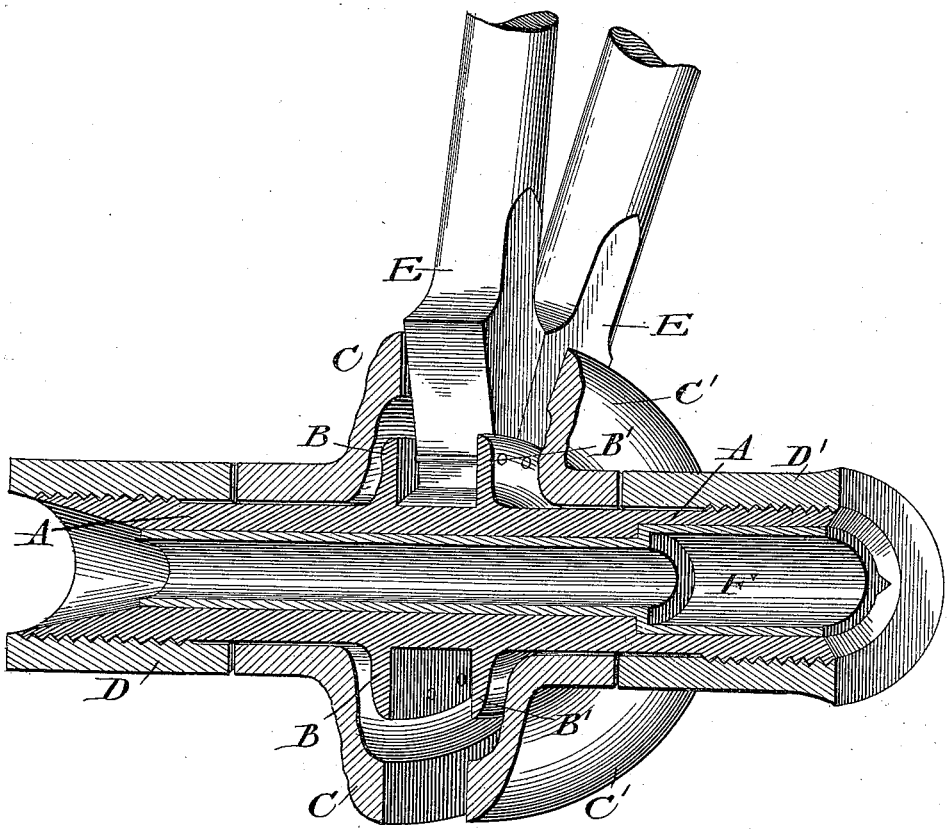
Witnesses
G. A. Kincaid
A. B. Weakley
Inventor:
William Augustus Emmerson

UNITED STATES PATENT OFFICE.

WILLIAM AUGUSTUS EMMERSON, OF COMANCHE, INDIAN TERRITORY.

VEHICLE-HUB.

SPECIFICATION forming part of Letters Patent No. 601,615, dated March 29, 1898.

Application filed March 9, 1897. Serial No. 626,696. (No model.)

*To all whom it may concern:*

Be it known that I, WILLIAM AUGUSTUS EMMERSON, a citizen of the United States, and a resident of Comanche, in the southern district of Indian Territory, have invented certain new and useful Improvements in Vehicle-Hubs; and I do declare the following to be a full, clear, and exact description of the invention, such as will enable others skilled in the art to which it appertains to make and use the same, reference being had to the accompanying drawing, and to letters of reference marked thereon, which forms a part of this specification.
The invention relates to improvements in "vehicle-hubs;" and it consists in the construction and novel combination of parts, as hereinafter set forth.

The object of my invention is to provide a vehicle-hub so constructed that the spokes of the wheel may be dished or straightened without removing, thereby avoiding the necessity of refilling the wheel and greatly reducing the expense of keeping vehicle-wheels in repair.
The figure of the drawing is a representation of this invention and is a vertical section.

Referring to the drawing, A designates a hub with threads cut on each end. Said threads are to engage hub-bands hereinafter described.

B B' are inner flanges projecting from the hub A, to which the spokes are riveted.

C C' are outer cup-shaped flanges placed on the hub A from each end. The inner annular edges of flanges or washers C C' are flared so as to press against the spokes over flanges B B' from each way, thereby furnishing the power to vary the dish in the wheel.

D D' are hub-bands threaded interiorly. By means of the threads they are screwed on the threaded ends of hub A. The inner annular edges of hub-bands D D' come in contact with the outer annular edges of flanges C C', forcing them against the spokes, as above mentioned. The outer ends of hub-bands D D' are octagon-shaped to admit an octagon-shaped wrench with which the hub-bands are turned.

E E represent spokes placed in the hub and riveted to flanges B B'. The spokes may be secured in the hub in any suitable manner.

F is a spindle-box through which the spindle passes.

The above-described hub is to be made of malleable cast-iron or such other material as may be deemed suitable for the purpose.

Having thus described my invention, what I claim as new, and desire to secure by Letters Patent, is—

1. The combination with a wheel-hub and spokes having their ends secured thereto, of two cup-shaped flanges having a bearing on the spokes some distance from their ends and means for adjusting said flanges, whereby the dish of the wheel may be controlled, substantially as described.

2. The combination with the hub A having screw-threads at each end and spokes secured to the central flanges thereof, of cup-shaped flanges B, B, and threaded hub-bands D, D, adapted to bear against the ends of the cup-shaped flanges C, C, substantially as described.

WILLIAM AUGUSTUS EMMERSON.

Witnesses:
   A. B. WEAKLEY,
   W. M. FREEMAN.